(12) United States Patent
Ai et al.

(10) Patent No.: US 8,536,750 B2
(45) Date of Patent: Sep. 17, 2013

(54) ELECTRIC MOTOR WITH AXIALLY MOVABLE ROTOR ASSEMBLY

(75) Inventors: Xiaolan Ai, Massillon, OH (US); Richard Knepper, North Canton, OH (US); Don Remboski, Ann Arbor, MI (US); Chris Van Dress, Alliance, OH (US); Brad Mularcik, Copley, OH (US)

(73) Assignee: The Timken Company, Canton, OH (US)

( * ) Notice: Subject to any disclaimer, the term of this patent is extended or adjusted under 35 U.S.C. 154(b) by 625 days.

(21) Appl. No.: 12/374,855

(22) PCT Filed: Jul. 24, 2007
(Under 37 CFR 1.47)

(86) PCT No.: PCT/US2007/074210
§ 371 (c)(1),
(2), (4) Date: Nov. 1, 2010

(87) PCT Pub. No.: WO2008/014253
PCT Pub. Date: Jan. 31, 2008

(65) Prior Publication Data
US 2011/0074238 A1    Mar. 31, 2011

Related U.S. Application Data

(60) Provisional application No. 60/820,211, filed on Jul. 24, 2006.

(51) Int. Cl.
*H02K 7/12* (2006.01)
*H02K 5/16* (2006.01)

(52) U.S. Cl.
USPC ............................................. 310/191; 310/91

(58) Field of Classification Search
USPC ..................... 310/191, 268, 90, 91
See application file for complete search history.

(56) References Cited

U.S. PATENT DOCUMENTS

| 5,551,918 | A | 9/1996 | Jones et al. |
| 7,342,342 | B2 * | 3/2008 | Naitou et al. ............. 310/209 |
| 2004/0063536 | A1 | 4/2004 | Atarashi |
| 2006/0097603 | A1 * | 5/2006 | Murota et al. ............. 310/261 |
| 2008/0265702 | A1 * | 10/2008 | Yeh ............................. 310/90 |

FOREIGN PATENT DOCUMENTS

| EP | 1653595 | | 6/2004 |
| EP | 1653595 | A1 * | 5/2006 |
| JP | 2002325412 | | 11/2002 |

OTHER PUBLICATIONS

International Search Report and Written Opinion dated Oct. 1, 2008 for International Application PCT/US2007/074210.
International Preliminary Report on Patentability dated Dec. 18, 2008 (corrected version).

* cited by examiner

*Primary Examiner* — Tran Nguyen
*Assistant Examiner* — Leda Pham
(74) *Attorney, Agent, or Firm* — Polster, Lieder, Woodruff & Lucchesi L.C.

(57) ABSTRACT

A mechanical structure (16) for enabling a rotor (28) in a permanent magnet electric motor A to be moved axially relative to a stator (14) under an actuating force, without experiencing frictional sliding during such a movement. As the rotor (28) is moved away from the stator (14), the motor magnetic field is weakened, enabling the motor A to operate efficiently at elevated speeds, extending speed coverage under constant power.

9 Claims, 9 Drawing Sheets

ELECTRIC MOTOR WITH AXIALLY MOVABLE ROTOR ASSEMBLY

CROSS-REFERENCE TO RELATED APPLICATIONS

This application is the United States National Stage under 35 U.S.C. §371 of International Application Serial No. PCT/US2007/074210 having an International Filing Date of Jul. 24, 2007, and is related to and claims priority to U.S. Provisional Patent Application No. 60/820,211, filed on Jul. 24, 2006, the contents of which are incorporated herein by reference.

TECHNICAL FIELD

The present disclosure generally relates to permanent magnet electric motors, and in particular, to an improved permanent magnet electric motor having an axially adjustable rotor for selectively altering a motor air gap between a rotor assembly and a stator assembly to accommodate a wide range of speed and torque applications.

BACKGROUND

With respect to permanent magnet motors, a trade off exists between permanent magnet motors having high torque at low speed and between permanent magnet motors having a wide speed range. If the permanent magnet motor is built such that large amounts of low end torque are produced, then the top end speed is reduced. If a high top speed is required, then the permanent magnet motor is built at the expense of low end torque.

For use in electrically-powered automobiles, it is desirable to have both high torque at low speed and a high top speed of the motor to avoid the necessity for a transmission assembly (which increases cost and complexity) to increase the speed range of the permanent magnet motor and still provide enough torque to accelerate the automobile at an acceptable rate. Several methods presently exist to address these concerns. These current methods reduce the flux density in the stator core. These methods typically include the operations of: (1) varying the air gap between the rotor and stator to alter the flux density in the stator and (2) introducing currents into the stator that create magnetic fields that oppose the magnetic fields of the permanent magnets on the stator.

Varying the air gap often requires very complex mechanical assemblies that involve frictional sliding between mechanical components as the rotor moves axially relative to the stator. Under torque load, however, frictional slide can be problematic. For example, frictional sliding is often associated with the "stick-and-slip" phenomena, imposing a great challenge for controlling the desired air gap.

It would be advantageous to provide a mechanism for axially adjusting the rotor assembly which is not restricted by frictional sliding between mechanical components, and accordingly, which may be easily adjusted under torque load conditions to accommodate a wide range of torque and speed settings for the motor.

SUMMARY OF THE DISCLOSURE

Briefly stated, the present disclosure provides a simple and effective mechanical structure that allows a rotor in a permanent magnet electric motor to be moved axially relative to the stator under an actuating force, without experiencing frictional sliding during such a movement. As the rotor moves away from the stator, the motor magnetic field is weakened, enabling the motor to operate efficiently at elevated speeds, extending speed coverage under constant power.

The foregoing features and advantages of the disclosure as well as presently preferred embodiments thereof will become more apparent from the reading of the following description in connection with the accompanying drawings.

BRIEF DESCRIPTION OF THE DRAWINGS

In the accompanying drawings which form part of the specification.

Corresponding reference numerals indicate corresponding parts throughout the several figures of the drawings. It is to be understood that the drawings are for illustrating the concepts of the disclosure and are not to scale.

BEST MODE FOR CARRYING OUT THE DISCLOSURE

The following detailed description illustrates the disclosure by way of example and not by way of limitation. The description enables one skilled in the art to make and use the disclosure, and describes several embodiments, adaptations, variations, alternatives, and uses of the disclosure, including what is presently believed to be the best mode of carrying out the disclosure.

Figure 1:
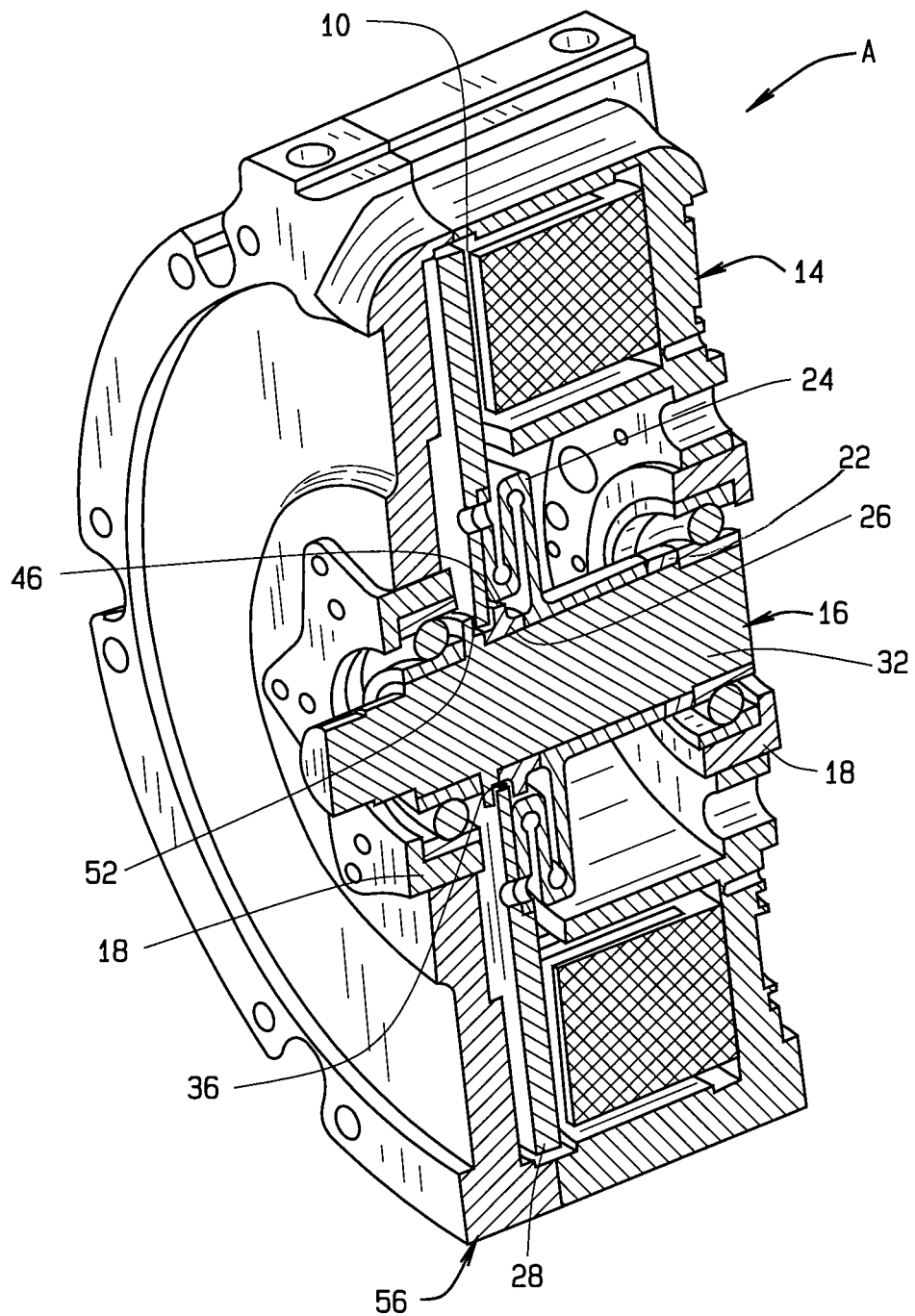
FIG. 1 is a cut-away perspective view of a permanent magnet electric motor illustrating a stator assembly and rotor assembly constructed in accordance with and embodying the present disclosure.
Figure 2A:
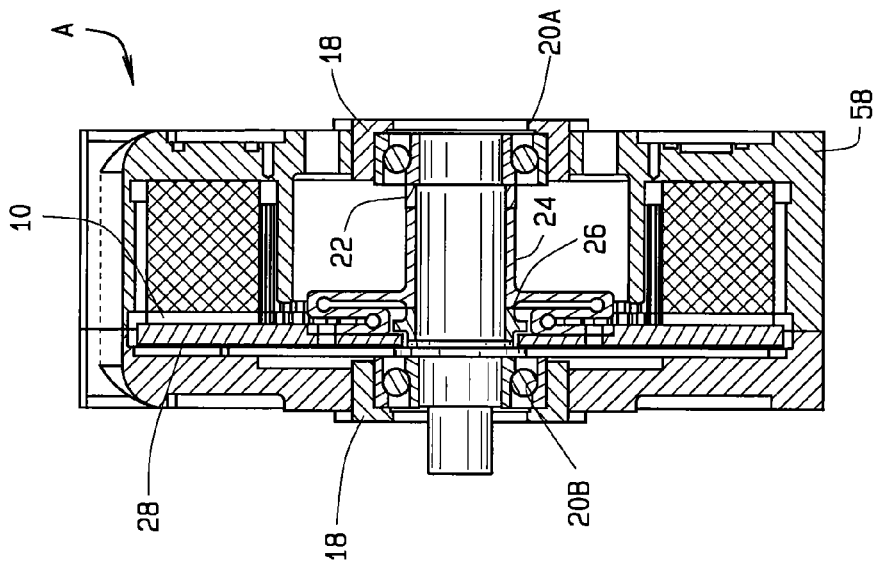
FIG. 2A is a section view taken along line 2A-2A of FIG. 2.
Figure 2:
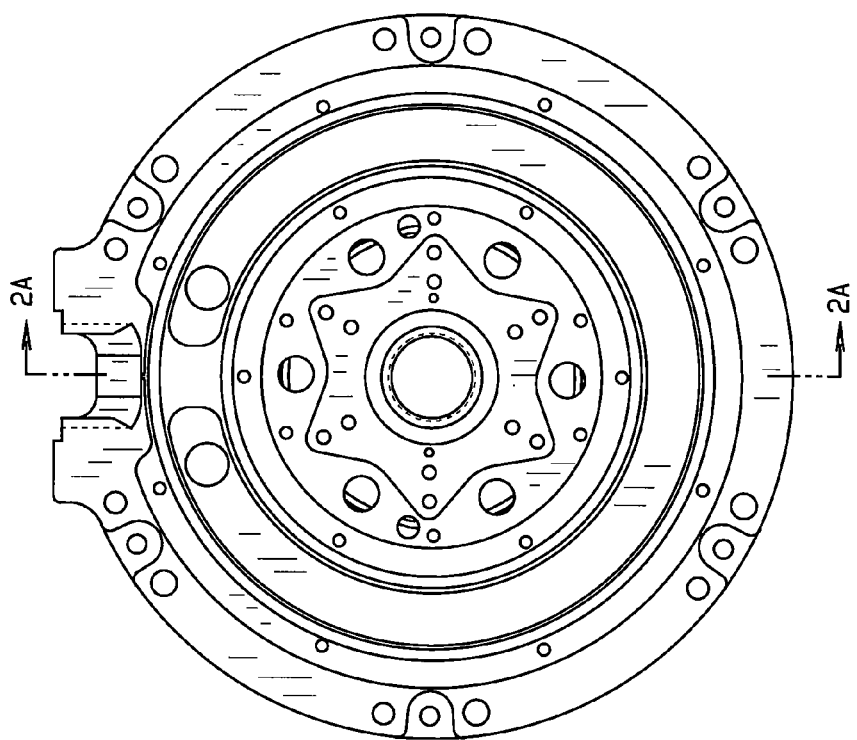
FIG. 2 is an end plan view of the motor of FIG. 1.
Figure 3:
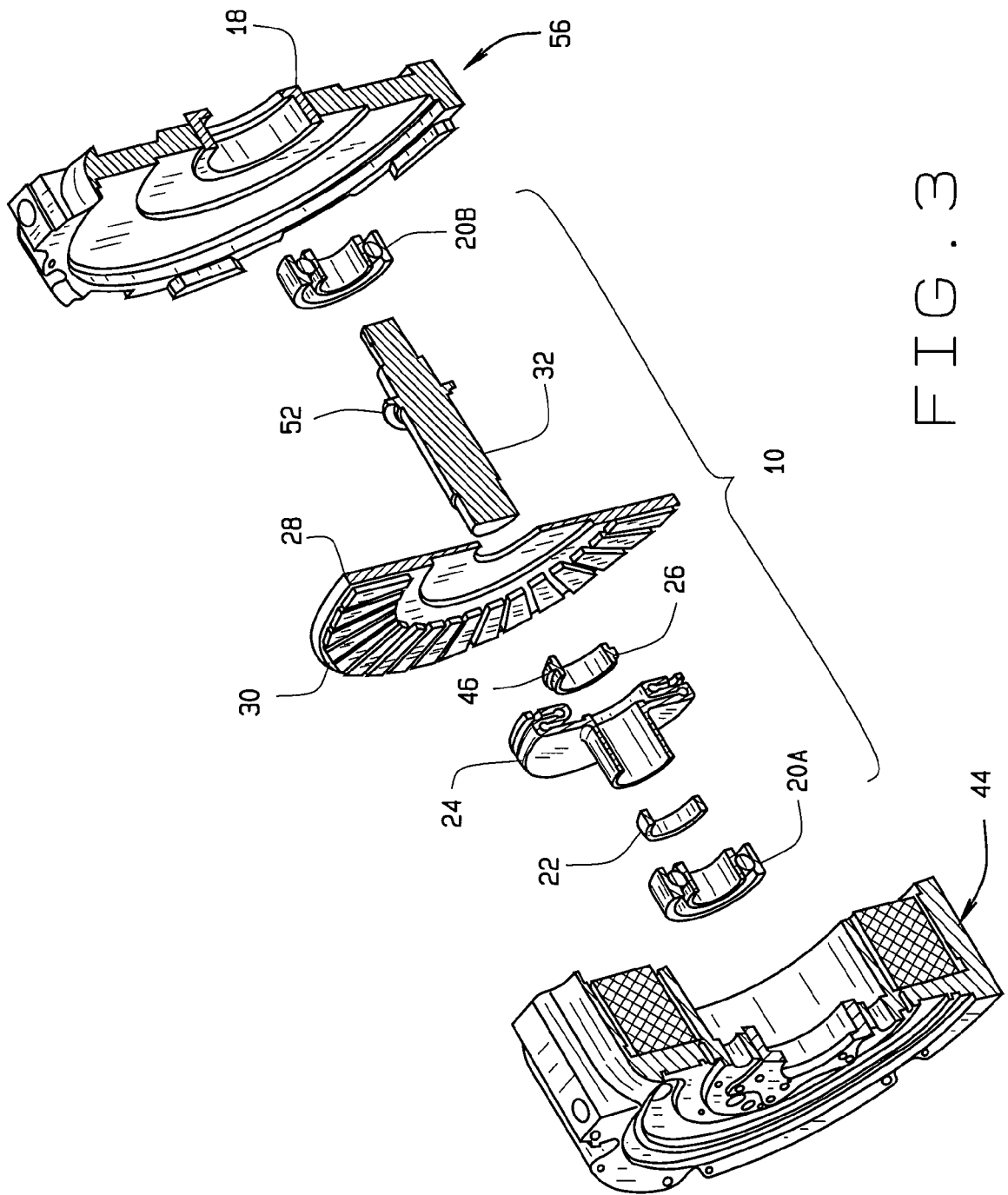
FIG. 3 is an exploded cut-away perspective view of the electric motor of FIG. 1 illustrating components of the stator assembly and the rotor assembly.

Referring to drawings, an electric motor, generally shown as A, having a movable air gap 10 is shown (FIGS. 1, 2 and 2A). The electric motor A comprises a housing (not shown) operatively connected to a stator assembly, generally shown as 14. The electric motor A also comprises a rotor assembly, generally shown as 16, supported within the housing by bearing cups 18. The rotor assembly 16 is supported in the housing with the movable air gap 10 positioned between the stator assembly 14 and the rotor assembly 16. As shown in FIG. 3, the rotor assembly 16 comprises two shaft supporting bearings 20A and 20B, a spacer 22, an axially deformable coupler 24, a disc stop flange 26, a rotor 28 with magnets 30, and a shaft 32. In an embodiment, the magnets 30 attach to the rotor 28 with their north-seeking faces and south-seeking faces outwardly arranged in an alternating sequence.

Figure 4:
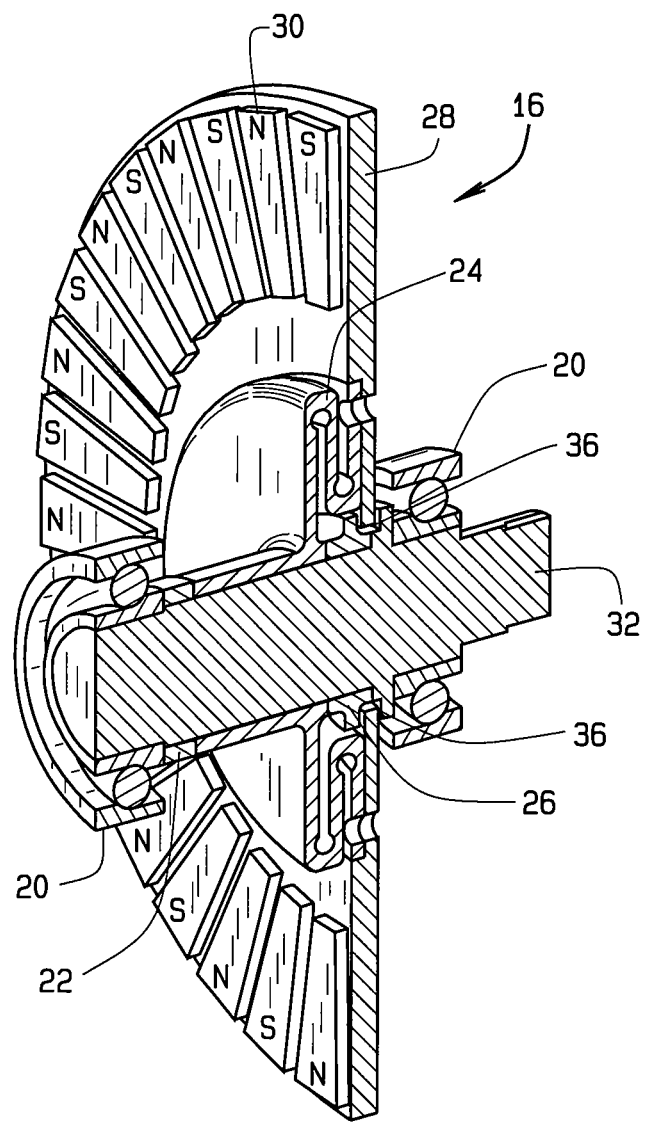
FIG. 4 is a cut-away perspective view of the rotor assembly of FIG. 3.

Turning to FIG. 4 and referring to FIG. 3, the rotor 28 is secured to the coupler 24 via a fastener (not shown) such as a bolt. The axially deformable coupler 24 secures to the shaft 32 through splines or keys of the shaft 32 to couple the rotor 28 to the shaft 32. The coupler 24 is firmly clamped on shaft 32 between the spacer 22 and stop flange 26 through settings of bearings 20A, B. As shown, the rotor 28 couples to the shaft 32 by the axially deformable coupler 24 with a clearance gap 36 between the rotor 28 and the shaft 32.

Figure 5:
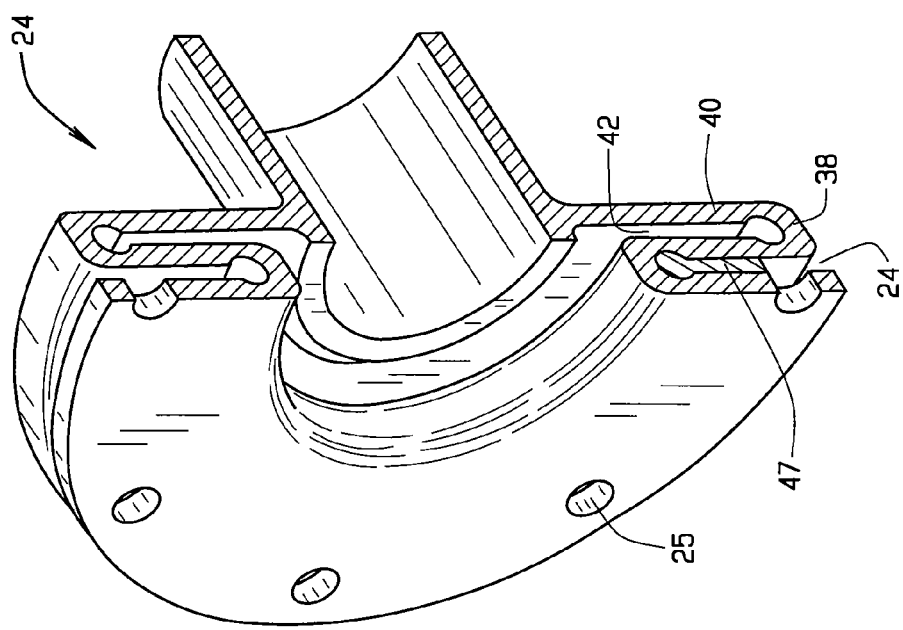
FIG. 5 is a cut-away perspective view of an axially deformable coupler of the rotor assembly of FIG. 4.

Referring to FIG. 5, the axially deformable coupler 24 includes an axial spring component 38 coaxial with the shaft 32 (FIG. 4). In an embodiment, the axial spring component 38 comprises spring members 40 distanced from each other by gaps 42 that are machined or formed in the coupler 24. The coupler 24 can be made from multiple parts to suit different manufacturing processes and cost targets. All configurations and means of manufacturing are considered within the scope of current disclosure.

The coupler 24 has strong torsional stiffness but allows the rotor 28 to move along axial direction with respect to shaft 32 and to move axially relative to the stator assembly 14 in response to an exerted axial force exerted on the rotor 28 as will be discussed. The movement is achieved through axial deformation of the coupler 24. The mechanical structure of the coupler 24 ensures a strong torsional stiffness and adequate axial spring rate as the coupler 24 axially moves with the rotor 28. Since the rotor 28 is coupled to the shaft 32 by the axially deformable coupler 24 with clearance gap 36 between the rotor 28 and the shaft 32, the rotor 28 axially moves relative to the stator assembly 14 free of frictional contact between the rotor 28 and the shaft 32. Additionally, the axial deformation of the coupler 24 alters the air gap 10 between the rotor 28 and the stator assembly 14.

Figure 6:
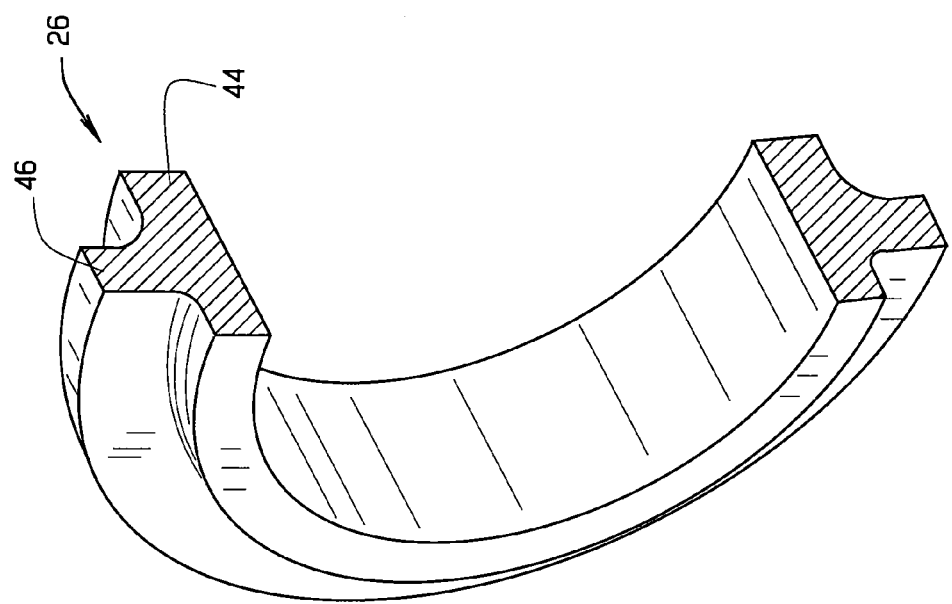
FIG. 6 is a cut-away perspective view of a disc stop flange of the rotor assembly of FIG. 4.

Turning to FIG. 6, the stop flange 26 comprises a cylindrical ring 44 and a rib 46 on the outer side of the ring 44. In the motor assembly, the rib 46 is positioned such that when assembled, the rib 46 will stop the rotor 28 from excessive travel towards the stator assembly 14, thus protecting the rotor 28 from "touch-down" with the stator assembly 14. Thus, the rib 46 prevents the rotor 28 from contacting the stator assembly 14 as the rotor 28 moves axially relative to the stator assembly 14. To improve the controllability of the air gap 10, and avoid or reduce possible oscillation during change or displacement of the air gap 10, damping material 47 (FIG. 5) can be filled or sandwiched in gaps 42.

Figure 7:
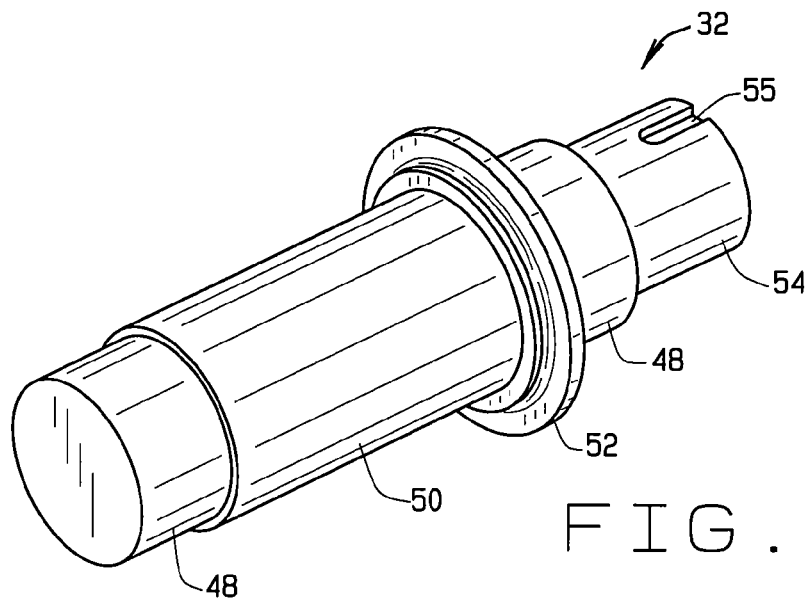
FIG. 7 is a cut-away perspective view of a rotor shaft 32 of the rotor assembly of FIG. 1.

The shaft 32, shown in FIG. 7, preferably consists of two seats 48 for bearings 20A and 20B, a cylindrical surface 50 with splines or key ways, a stop rib 52 and a cylindrical external coupling surface 54. Key ways 55 are cut on the coupling surface 50 to couple the coupler 24 to the shaft 32. In the motor assembly, the rotor 28 is coupled to the shaft 32 by the deformation coupler 24 between the rib 46 of the disc stop flange 26 and the stop rib 52 of the shaft 32 (FIG. 1). The stop rib 52 is positioned to prevent excessive travel of the rotor 28 towards housing cover 56 (FIG. 1), thus protecting the rotor 28 from "touch-down" with the housing cover 56. Thus, the stop rib 52 prevents the rotor 28 from contacting the housing cover 56 as the rotor 28 moves axially relative to the stator assembly 14.

Figure 8:
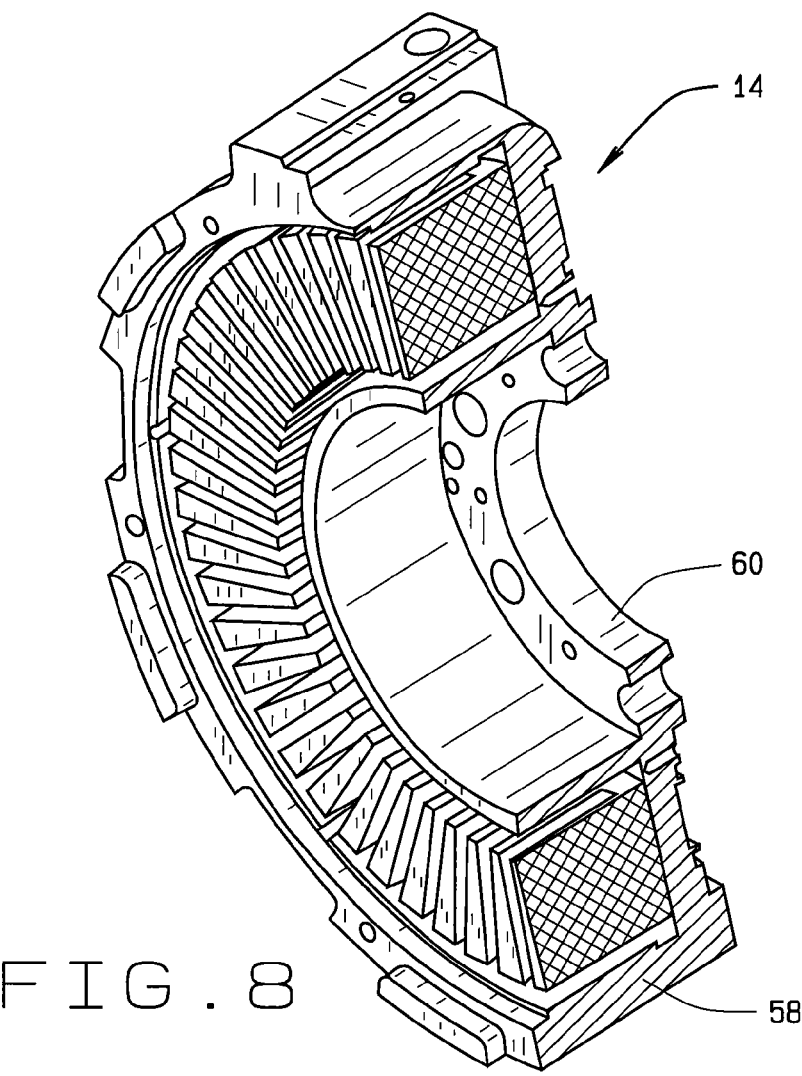
FIG. 8 is a cut-away perspective view of the stator assembly of the motor of FIG. 1.
Figure 10:
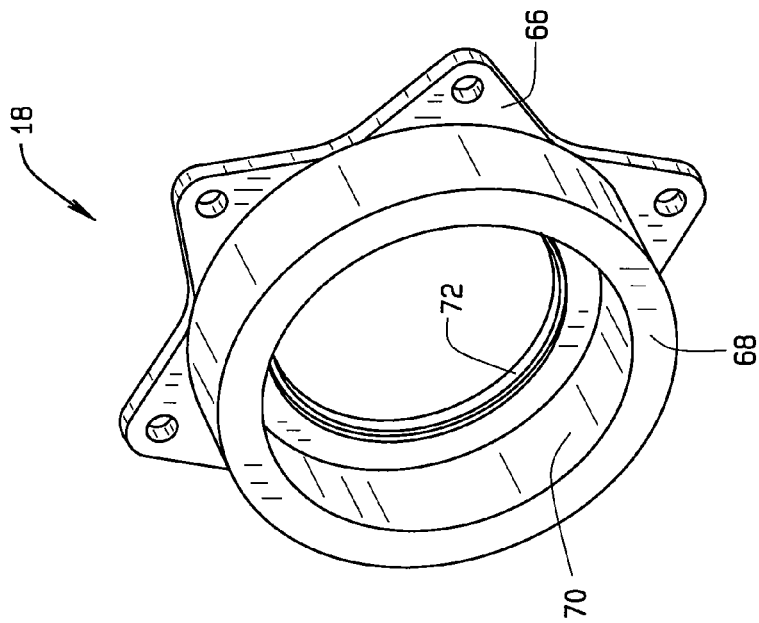
FIG. 10 is perspective view of a bearing support of the motor of FIG. 1.
Figure 9:
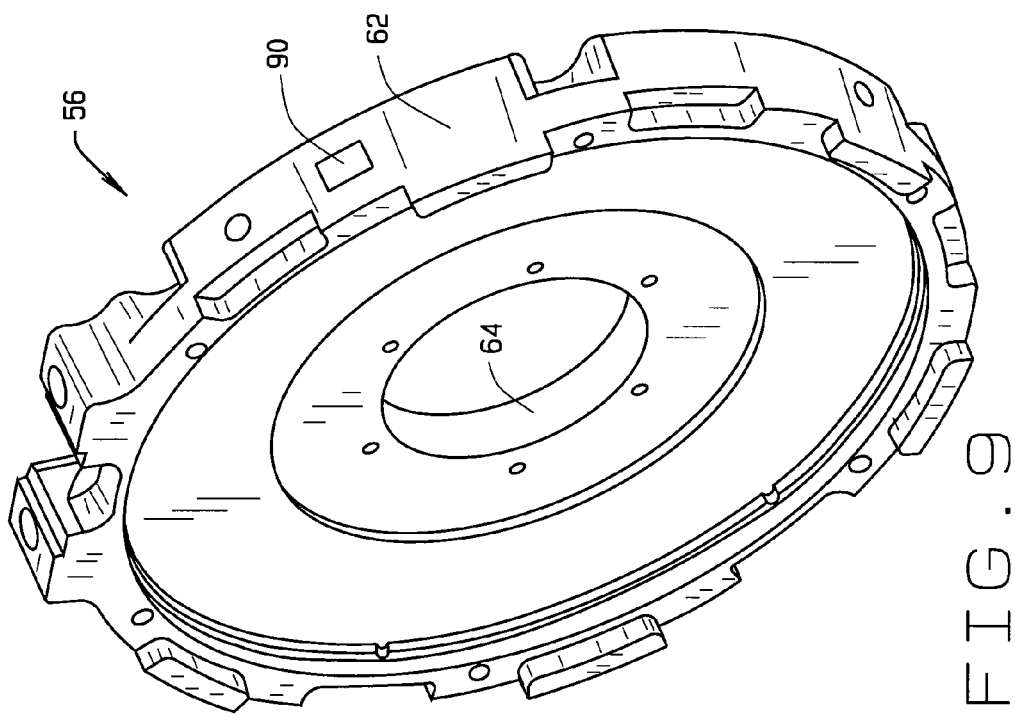
FIG. 9 is a perspective view of a front housing of the stator assembly of FIG. 8.

Referring to FIG. 8, the stator assembly 14 is comprised of a motor housing 58 and a stator core with windings (not shown). The housing 58 has a bore 60 opened at the side wall of the housing 582. The open bore 60 is provided to receive the first bearing cup 18. The housing cover 56, shown in FIG. 9, is made substantially from an annular plate 62. A bore 64 is cut through the center of the plate for receiving the second bearing cup 18. The housing cover 56 is bolted to motor housing 58 to enclose the motor A. The bearing cups 18 (FIG. 10) consist of mounting ears 66 for mounting to motor housing 58 or housing cover 56, and an annular ring 68 with inner cylindrical surface 70 for retaining bearings 20A and 20B. The cylindrical surface 70 has shoulder 72 at one of its ends for position the bearing 20 it retains.

Figure 11:
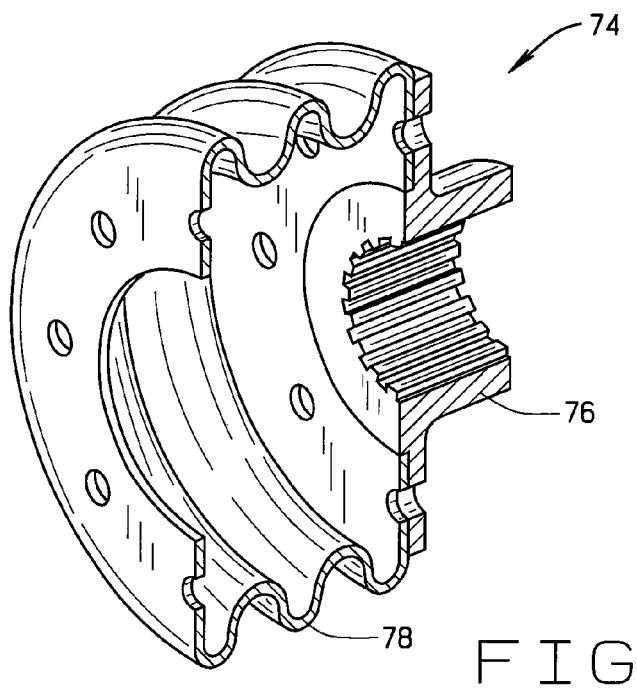
FIG. 11 is a cut-away perspective view of an alternate axially deformable coupler constructed in accordance with and embodying the present disclosure.
Figure 12:
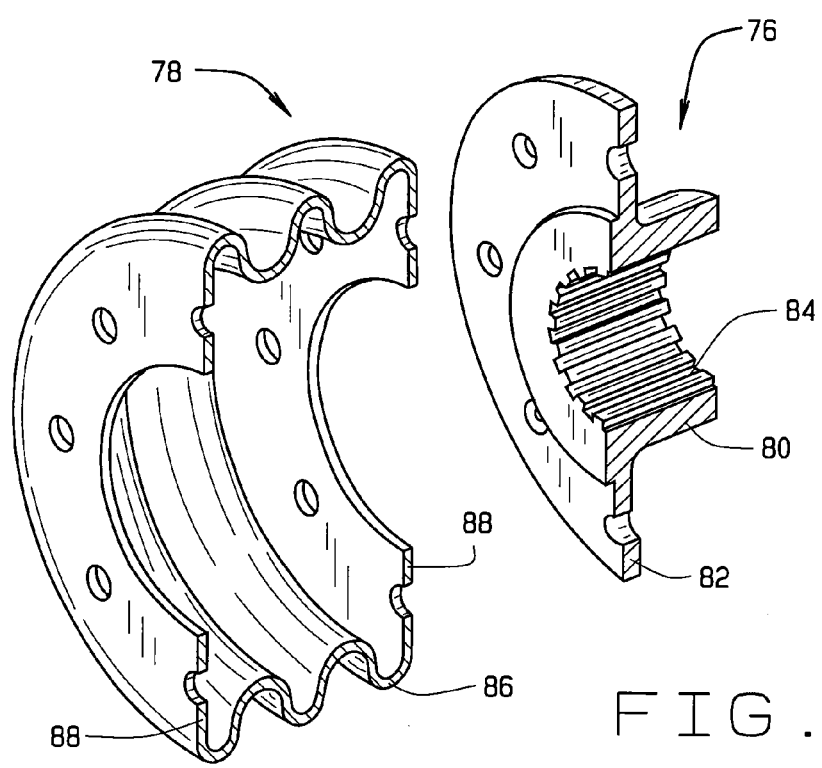
FIG. 12 is an exploded cut-away perspective view of the deformable coupler of FIG. 11.
Figure 13:
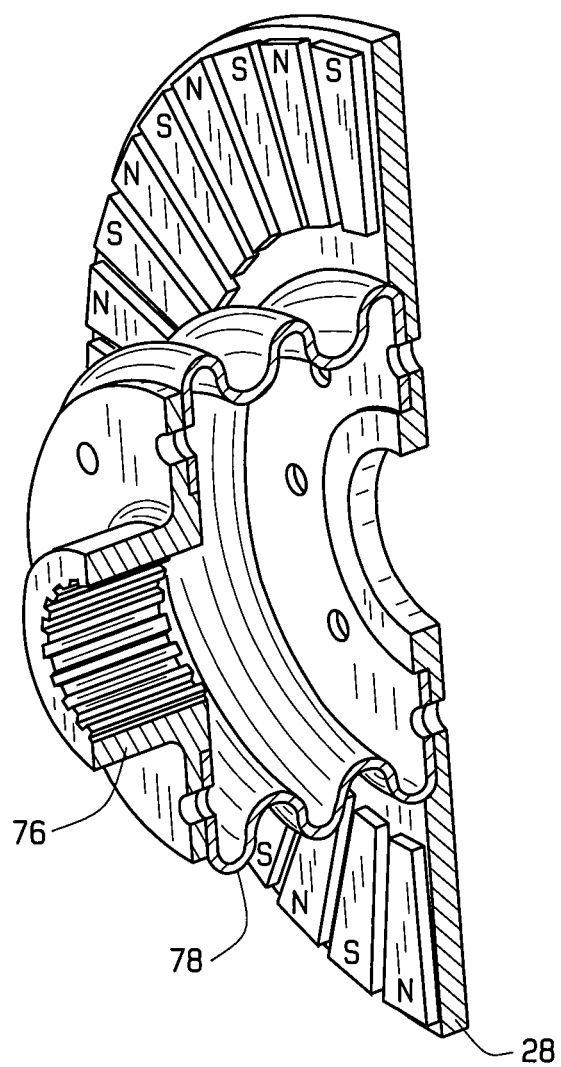
FIG. 13 is a cut-away perspective view of the alternate deformable coupler mounted to a rotor.

FIG. 11 illustrates another embodiment of a coupler 74 constructed in accordance with and embodying the present disclosure. Coupler 74 also has the desired torsional and axial characteristics as previously noted. Coupler 74 comprises a hub 76 and a spring tube 78. In an embodiment, the spring tube 78 has a wave configuration. As shown in FIG. 12, the hub 76 has hub portion 80 and a mounting flange 82. The hub portion 80 further comprises an internal spline 84 for coupling with the shaft 32. The spring tube 78 has a body 86 and annular plates 88 for mounting. The spring tube 78 is secured to the hub 76 by a fastener (not shown) such as a bolt at one end and secured to the rotor 28 at the other end (FIG. 13). The spring tube 78 has strong torsional stiffness but is flexible in axial direction. The spring tube 78 deforms and, thus, provides axial displacement when force exerts on rotor 28 as required by air gap adjustment for magnetic field weakening.

During operation, the motor A is controlled by a known electronic controller (not shown) that adjusts the pulse width and frequency of current traveling through the windings of the stator assembly in order to control the torque and speed of the motor and maintain current within motor limitations. The coupler 24 and the rotor 28 of the present disclosure, in response to an operating state of the electric motor A, alters the air gap 10 between the rotor 28 and the stator assembly 14 to alter the flux density in the stator assembly 14. The air gap 10 is altered by exerting an axial force on the rotor 28. The axial force causes the axial displacement of the rotor 28 with respect to the stator assembly 14. Since the rotor 28 is secured to the coupler 24, the coupler 24 axially deforms in response to the axial force, thereby altering the air gap 10.

The coupler 24 ensures a strong torsional stiffness and adequate axial spring rate as the coupler 24 axially moves with the rotor 28. Since the rotor 28 is coupled to the shaft 32 by the axially deformable coupler 24 with clearance gap 36 between the rotor 28 and the shaft 32, the rotor 28 axially moves relative to the stator assembly 14 free of frictional contact between the rotor 28 and the shaft 32. As the rotor 28 moves away from the stator assembly 14, the motor magnetic field is weakened, enabling the motor A to operate efficiently at elevated speeds, extending speed coverage under constant power. When the exerted force is released, the axially deformable coupler 24 axially moves the rotor 28 away from the stator assembly 14. In an embodiment, the air gap 10 is altered responsive to a motor rotational speed. In another embodiment, the air gap 10 is altered responsive to a motor torque load.

Different means exist to exert the axial force on the rotor 28. For example, a solenoid 90 (FIG. 9) positioned on the housing cover 52 can exert an axial force by generating a magnetic field. When energized, the coil and the core (not shown) of the solenoid 90 generate a magnetic field that attracts the back plate of the rotor 28 toward the housing cover 56 and from the stator assembly 14, which increases the air gap 10 between the rotor 28 and stator assembly 14. This increased air gap 10, in turn, reduces the magnetic flux in the stator assembly 14, thus weakening the magnetic field of the electric motor A.

As various changes could be made in the above constructions without departing from the scope of the disclosure, it is intended that all matter contained in the above description or shown in the accompanying drawings shall be interpreted as illustrative and not in a limiting sense.

The invention claimed is:

1. An improved electric motor having a rotor assembly supported in operable relationship to a stator assembly on a rotor shaft within a housing by a bearing, the improvement comprising:

an axially deformable coupler positioned within housing for coupling a rotor of the rotor assembly to the rotor shaft with a clearance gap between the rotor and the rotor shaft, the axially deformable coupler configured to enable the rotor to move axially relative to the stator assembly and to enable the rotor to move free of frictional-sliding contact with respect to the rotor shaft; and, the rotor assembly further including a pair of shaft support bearings, a spacer, and a disc stop flange aligned around the rotor shaft, the axially deformable coupler being secured to the rotor shaft between the spacer and the disc stop flange by settings of the shaft support bearings, the disc stop flange including a rib that is configured to prevent the rotor from contacting the stator assembly, and the rotor shaft including another rib such that the rotor is coupled to the rotor shaft by the deformable coupler between the rib of the disc stop flange and the another rib of the rotor shaft.

2. The improved electric motor of claim 1 wherein an axial movement of the rotor maintains a parallel orientation between the rotor and the stator assembly.

3. The improved electric motor of claim 1 wherein the axially deformable coupler is secured to the rotor shaft by at least one spline.

4. The improved electric motor of claim 1 wherein the rib of the rotor shaft is configured to prevent the rotor from contacting the housing.

5. The improved electric motor of claim 1 wherein the axially deformable couple has a torsional stiffness.

6. An improved electric motor having a rotor assembly supported in operable relationship to a stator assembly on a rotor shaft within a housing by a bearing, the improvement comprising:

an axially deformable coupler positioned within housing for coupling a rotor of the rotor assembly to the rotor shaft with a clearance gap between the rotor and the rotor shaft, the axially deformable coupler configured to enable the rotor to move axially relative to the stator assembly and to enable the rotor to move free of frictional-sliding contact with respect to the rotor shaft, and wherein the axially deformable coupler includes an axial spring component coaxial with the rotor shaft, the axial spring component comprises spring members distanced from each other by a gap, and the axial spring component includes a damping material positioned within the gap and in contact with the spring members.

7. The improved electric motor of claim 1 wherein the axially deformable coupler includes a hub and a spring tube supporting the rotor, the hub configured for operatively coupling to the rotor shaft, and the spring tube configured for axial deformation.

8. The improved electric motor of claim 1 further including at least one solenoid positioned on the housing, the solenoid operatively configured to generate a magnetic field to axially displace the rotor from the stator assembly.

9. An electric motor comprising:

a housing;

a stator assembly secured to the housing; and a rotor assembly supported in operable relationship to the stator assembly on a rotor shaft positioned within the housing by shaft support bearings, the rotor assembly being rotatable relative to the housing about an axis of rotation of the rotor shaft, the rotor assembly includes a rotor, an axially deformable coupler, a spacer, a disc stop flange wherein the axially deformable couple is secured to the rotor shaft between the spacer and the disc stop flange by settings of the shaft support bearings wherein the axially deformable coupler is configured to couple the rotor to the rotor shaft and is configured to alter an air gap between the stator assembly and the rotor assembly by enabling the rotor to move axially relative to the stator assembly in response to an exerted axial force and by enabling the rotor to move free of frictional-sliding contact with respect to the rotor shaft; and, the disc stop flange includes a rib configured to prevent the rotor from contacting the stator assembly and the rotor shaft includes another rib such that the rotor is coupled to the rotor shaft by the deformable coupler between the rib of the disc stop flange and the other rib of the rotor shaft, and wherein the rib of the rotor shaft is configured to prevent the rotor from contacting the housing.

* * * * *

UNITED STATES PATENT AND TRADEMARK OFFICE
CERTIFICATE OF CORRECTION

PATENT NO. : 8,536,750 B2
APPLICATION NO. : 12/374855
DATED : September 17, 2013
INVENTOR(S) : Xiaolan Ai et al.

It is certified that error appears in the above-identified patent and that said Letters Patent is hereby corrected as shown below:

In the Specification

In Column 2, line 29, after the word shaft delete "32".

Signed and Sealed this
Fifth Day of November, 2013

Teresa Stanek Rea
*Deputy Director of the United States Patent and Trademark Office*

UNITED STATES PATENT AND TRADEMARK OFFICE
CERTIFICATE OF CORRECTION

PATENT NO. : 8,536,750 B2  Page 1 of 1
APPLICATION NO. : 12/374855
DATED : September 17, 2013
INVENTOR(S) : Ai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1272 days.

Signed and Sealed this
Fifteenth Day of September, 2015

Michelle K. Lee
*Director of the United States Patent and Trademark Office*